United States Patent
Kim et al.

(10) Patent No.: US 9,295,058 B2
(45) Date of Patent: Mar. 22, 2016

(54) METHOD AND APPARATUS FOR TRANSMITTING DATA

(71) Applicant: LG ELECTRONICS INC., Seoul (KR)

(72) Inventors: Hakseong Kim, Anyang-si (KR); Byounghoon Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 6 days.

(21) Appl. No.: 14/383,003

(22) PCT Filed: Mar. 29, 2013

(86) PCT No.: PCT/KR2013/002656
§ 371 (c)(1),
(2) Date: Sep. 4, 2014

(87) PCT Pub. No.: WO2013/151280
PCT Pub. Date: Oct. 10, 2013

(65) Prior Publication Data
US 2015/0071194 A1 Mar. 12, 2015

Related U.S. Application Data

(60) Provisional application No. 61/619,926, filed on Apr. 3, 2012, provisional application No. 61/621,563, filed on Apr. 8, 2012.

(51) Int. Cl.
*H04W 72/04* (2009.01)
*H04L 5/00* (2006.01)
*H04L 27/26* (2006.01)

(52) U.S. Cl.
CPC ......... *H04W 72/0446* (2013.01); *H04L 5/0048* (2013.01); *H04L 27/2613* (2013.01); *H04W 72/042* (2013.01); *H04W 72/0413* (2013.01)

(58) Field of Classification Search
CPC .............. H04W 72/0446; H04W 72/0413; H04W 72/042; H04L 5/0048; H04L 27/2613
See application file for complete search history.

(56) References Cited

U.S. PATENT DOCUMENTS

| 2011/0064159 | A1* | 3/2011 | Ko | H04B 7/04 375/267 |
| 2011/0194536 | A1* | 8/2011 | Kim | H04L 5/0023 370/335 |
| 2013/0100907 | A1* | 4/2013 | Liu | H04L 5/0023 370/329 |
| 2015/0003346 | A1* | 1/2015 | Kim | H04L 5/001 370/329 |

FOREIGN PATENT DOCUMENTS

| KR | 10-2011-0086523 A | 7/2011 |
| KR | 10-2011-0093564 A | 8/2011 |
| KR | 10-2011-0108289 A | 10/2011 |
| WO | WO 2011/075908 A1 | 6/2011 |
| WO | WO 2011/099663 A1 | 8/2011 |

\* cited by examiner

*Primary Examiner* — Ajay Cattungal
(74) *Attorney, Agent, or Firm* — Birch, Stewart, Kolasch & Birch, LLP

(57) ABSTRACT

The present invention relates to a method and apparatus for transmitting data. In the method for transmitting data, a first transmission point can determine a reference signal sequence r(m) and transmit the determined reference signal sequence r(m) to a terminal. A parameter ns from among parameters for generating an initial value c_init of a pseudorandom sequence in order to determine the reference signal sequence can be determined on the basis of the slot number of a wireless frame, which a second transmission point transmits to the terminal. Accordingly, the demodulation performance of the terminal can be enhanced.

12 Claims, 11 Drawing Sheets

METHOD AND APPARATUS FOR TRANSMITTING DATA

CROSS REFERENCE TO RELATED APPLICATIONS

This application is the National Phase of PCT International Application No. PCT/KR2013/002656 filed on Mar. 29, 2013, which claims priority under 35 U.S.C. 119(e) to U.S. Provisional Application Nos. 61/619,926 filed on Apr. 3, 2012 and 61/621,563 filed on Apr. 8, 2012. All of which are hereby expressly incorporated by reference into the present application.

BACKGROUND OF THE INVENTION

1. Field of the Invention

The present invention relates to wireless communications, and more specifically, to a method and apparatus of transmitting data in a base station.

2. Related Art

The recent advent of the smartphone has sharply increased users' demand for support of good-quality data services. This led to the need of some technique that may support high data rate for terminals positioned at the edge of a cell, as well as terminals in the center of the cell. The center of each cell may enjoy increased data transmission speed simply by backing up the cell with additional antenna ports. However, in the edge of each cell, increasing data speed without cooperation between cells is limited by interference from the neighbor cells. Further, the frequency reuse technique through small cells such as pico cells or femto cells in a macrocell area is adopted in order to offer a high-speed data service even in a user-crowded region, and this results in the increased need for an efficient interference control method between transmission points.

The methods for controlling interference between transmission points are gaining attention. In particular, 3GPP (3rd Generation Partnership Project) denotes such interference control technique as CoMP (Coordinated Multi-Point transmission and reception) and is underway for standardization as an LTE-Advanced Release 11 work item.

The methods supported for CoMP in LTE-advanced release 11 may be divided into CS (Coordinated Scheduling), CB (Coordinated Beamforming), JP (Joint Processing), and DPS (Dynamic Point Selection). CS is a CoMP scheme that adjusts the time or frequency resources for transmission of signals to a terminal between transmission points in order to reduce interference on other transmission points. CB is a CoMP scheme that properly adjusts the direction of beams for transmission of signals between transmission points in order to reduce interference on other transmission points. JP is a CoMP scheme in which a plurality of transmission points perform simultaneous transmission to one terminal, and DPS is a CoMP scheme that dynamically varies transmission points considering the channel state of a terminal.

SUMMARY OF THE INVENTION

An object of the present invention is to provide a data transmission method.

Another object of the present invention is to provide an apparatus that performs a data transmission method.

To achieve the above objects of the present invention, according to an aspect of the present invention, there is provided a method of transmitting data, the method comprising transmitting a reference signal sequence r(m) to a terminal, wherein a first transmission point may determine the reference signal sequence r(m) as follows:

$$r(m) = \frac{1}{\sqrt{2}}(1 - 2 \cdot c(2m)) + j\frac{1}{\sqrt{2}}(1 - 2 \cdot c(2m+1)),$$

wherein m is an RB (resource block) corresponding to a frequency bandwidth of a downlink channel, and c( ) denotes a pseudo-random sequence, wherein an initial value, $c_{init}$, of the pseudo-random sequence may be determined as follows: $c_{init} = (\lfloor n_s/2 \rfloor + 1) \cdot (2X+1) \cdot 2^{16} + Y$, wherein ns is a slot number in a radio frame, X is a first initial value determining parameter, and Y is a second initial value determining parameter, and wherein ns may be determined based on a slot number of a radio frame transmitted from a second transmission point to the terminal.

To achieve the above objects of the present invention, according to an aspect of the present invention, there is provided a first base station transmitting data in a wireless communication system, the first base station comprising a processor and configured to transmit a reference signal sequence r(m) to a terminal, wherein the processor may determine the reference signal sequence r(m) as follows:

$$r(m) = \frac{1}{\sqrt{2}}(1 - 2 \cdot c(2m)) + j\frac{1}{\sqrt{2}}(1 - 2 \cdot c(2m+1)),$$

wherein m is an RB (resource block) corresponding to a frequency bandwidth of a downlink channel, and c( ) denotes a pseudo-random sequence, wherein an initial value, $c_{init}$, of the pseudo-random sequence may be determined as follows: $c_{init} = (\lfloor n_s/2 \rfloor + 1) \cdot (2X+1) \cdot 2^{16} + Y$, wherein ns is a slot number in a radio frame, X is a first initial value determining parameter, and Y is a second initial value determining parameter, and wherein ns may be determined based on a slot number of a radio frame transmitted from a second base station to the terminal.

The demodulation performance of the terminal may be enhanced.

DESCRIPTION OF EXEMPLARY EMBODIMENTS

The wireless device may be stationary or mobile and may be referred to by other terms such as UE (User Equipment), MS (mobile station), MT (mobile terminal), UT (user terminal), SS (subscriber station), PDA (personal digital assistant), wireless mode), or handheld device. Or, the wireless device may be a device that supports only data communication such as MTC (Machine-Type Communication).

The base station (BS) is typically a fixed station that communicates with the wireless device and may be referred to by other terms such as eNB (evolved-NodeB), BTS (Base Transceiver System), or access point.

Hereinafter, the present invention applies to 3GPP (3rd Generation Partnership Project) TS (Technical Specification) release 8-based 3GPP LTE (Long Term Evolution) or 3GPP TS release 10-based 3GPP LTE-A. This is, however, merely an example, and the present invention applies to various wireless communication networks. Hereinafter, LTE includes LTE and/or LTE-A.

Figure 1:
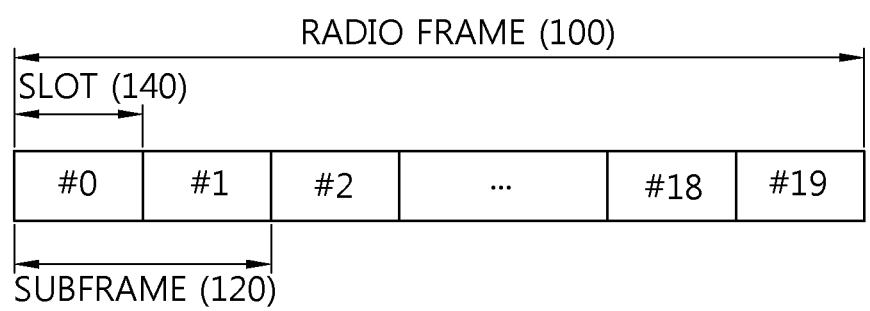
FIG. 1 shows the structure of a radio frame in 3GPP (3rd Generation Partnership Project) LTE (Long Term Evolution).

FIG. 1 shows the structure of a radio frame in 3GPP (3rd Generation Partnership Project) LTE (Long Term Evolution).

For the structure of the radio frame 100 in 3GPP LTE, refer to 3GPP (3rd Generation Partnership Project) TS 36.211 V8.2.0 (2008-03) "Technical Specification Group Radio Access Network; Evolved Universal Terrestrial Radio Access (E-UTRA); Physical channels and modulation (Release 8)," Ch. 5. Referring to FIG. 1, the radio frame 100 includes 10 subframes 120, and one subframe 120 includes two slots 140. The slots in the radio frame 100 may be indexed slot #0 through slot #19, or the subframes 120 may be indexed subframe #0 through subframe #9. Subframe #0 may include slot #0 and slot #1.

The time taken for one subframe 120 to be transmitted is denoted TTI (Transmission Time Interval). The TTI may be the scheduling unit for data transmission. For example, the length of one radio frame 100 may be 10 ms, the length of one subframe 120 may be 1 ms, and the length of one slot 140 may be 0.5 ms.

One slot 140 includes a plurality of OFDM (Orthogonal Frequency Division Multiplexing) symbols in the time domain and a plurality of sub-carriers in the frequency domain. The OFDM symbol is to represent one symbol period considering that 3GPP LTE adopts OFDMA for downlink, and the OFDM symbol may be referred to by other terms depending on the multiple access schemes. For example, in case SC-FDMA (Single Carrier-Frequency Division Multiple Access) is adopted for uplink multiple access scheme, it may be denoted SC-FDMA symbol. The resource block (RB) is the unit of resource allocation and includes a plurality of contiguous sub-carriers in one slot. The resource block will be described in detail with reference to FIG. 2. The structure of the radio frame 100 shown in FIG. 1 is an embodiment of the frame architecture. Accordingly, the number of subframes 120 included in the radio frame 100, the number of slots 140 included in the subframe 120, or the number of OFDM symbols included in the slot 140 may be varied to thus define a new radio frame format.

3GPP LTE defines that, when normal cyclic prefix (CP) is adopted, one slot includes seven OFDM symbols, and when extended CP is adopted, one slot includes six OFDM symbols.

Wireless communication systems may be generally classified into ones adopting FDD (Frequency Division Duplex) scheme and ones adopting TDD (Time Division Duplex) scheme. As per the FDD scheme, uplink transmission and downlink transmission are achieved, occupying different frequency bands, respectively. As per the TDD scheme, uplink transmission and the downlink transmission are performed for different times, occupying the same frequency band. The channel response in the TDD scheme is substantially reciprocal. This means that the downlink channel response is almost the same as the uplink channel response in a given frequency domain. Accordingly, in the TDD-based wireless communication system, the downlink channel response may be acquired from the uplink channel response. In the TDD scheme, the overall frequency band is time-divided for uplink transmission and downlink transmission, and thus, the downlink transmission by the base station may be performed simultaneously with the uplink transmission by the terminal. In the TDD system in which uplink transmission and downlink transmission are separated in units of subframes, the uplink transmission and the downlink transmission are performed in different subframes.

Figure 2:
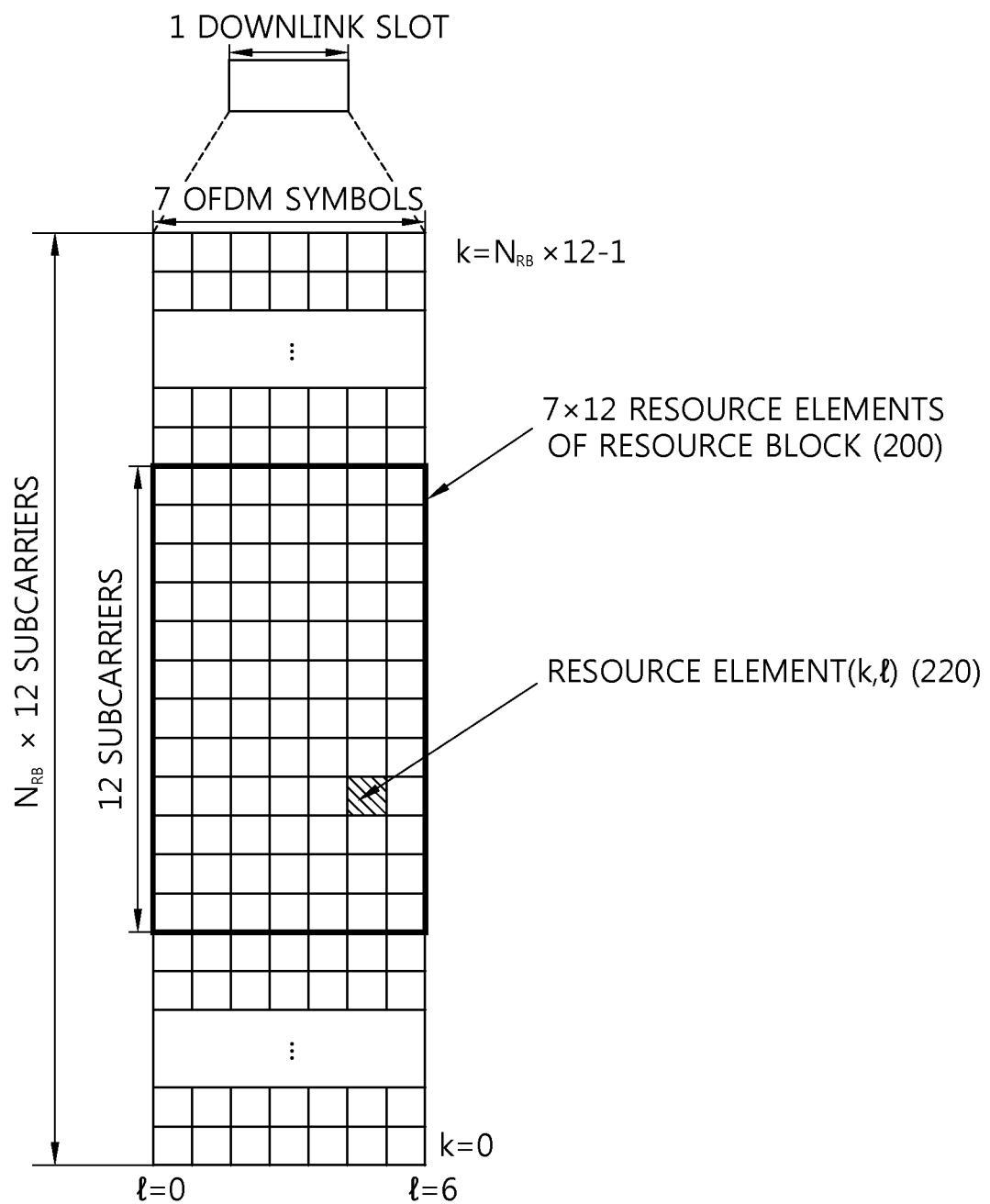
FIG. 2 shows an example resource grid for a downlink slot.

FIG. 2 shows an example resource grid for a downlink slot.

The downlink slot includes a plurality of OFDM symbols in the time domain and NRB resource blocks in the frequency domain. The number, NRB, of the resource blocks included in the downlink slot depends upon the downlink transmission bandwidth set in the cell. For example, NRB in the LTE system may be any one from 6 to 110 depending on the transmission bandwidth adopted. One resource block 200 includes a plurality of sub-carriers in the frequency domain. The structure of the uplink slot may be the same as the structure of the downlink slot.

Each element in the resource grid is denoted resource element 220. The resource element 220 in the resource grid may be identified by an index pair k, 1 in the slot. Here, k(k= 0, . . . , NRBx12-1) is a sub-carrier index in the frequency domain, and 1(1=0, . . . , 6) is an OFDM symbol index in the time domain.

Although one resource block 200 includes 7×12 resource elements 220 consisting of seven OFDM symbols in the time domain and 12 sub-carriers in the frequency domain, for example, the number of OFDM symbols and the number of sub-carriers in the resource block 200 are not limited thereto. The number of OFDM symbols and the number of sub-carriers may be varied depending on the length of CP or frequency spacing. For example, in the case of normal CP, the number of OFDM symbols is 7, and in the case of extended CP, the number of OFDM symbols is 6. The number of sub-carriers in one OFDM symbol may be selected as one of 128, 256, 512, 1024, 1536, and 2048.

Figure 3:
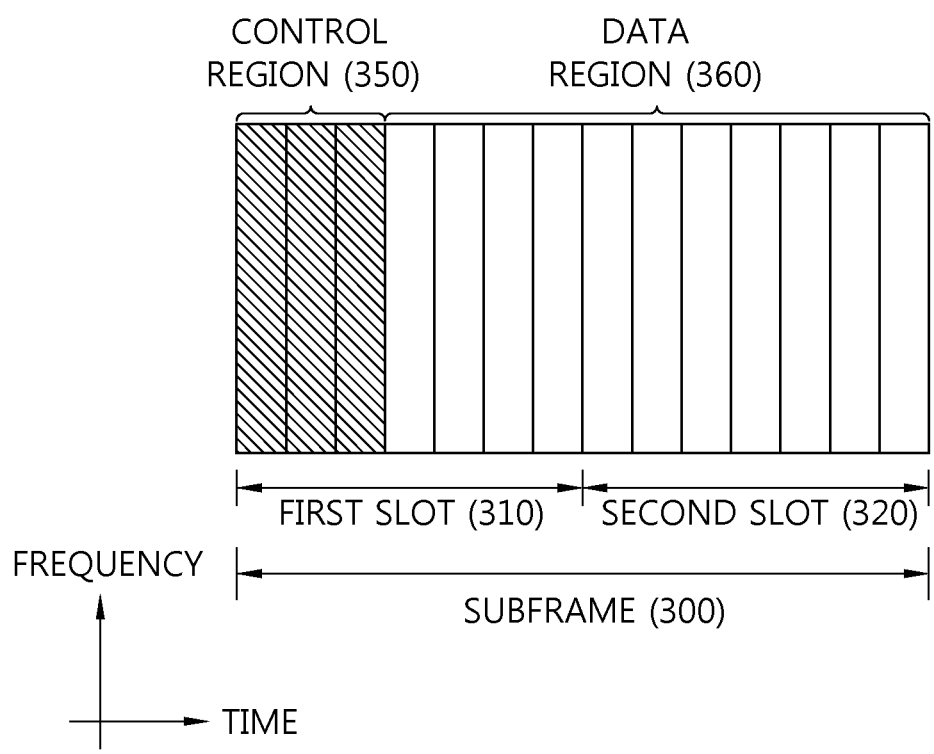
FIG. 3 shows the structure of a downlink subframe.

FIG. 3 shows the structure of a downlink subframe.

The downlink subframe 300 includes two slots 310 and 320 in the time domain, and each slot 310 and 320 includes seven OFDM symbols in the case of normal CP. The first three OFDM symbols (up to four OFDM symbols for a 1.4 Mhz bandwidth) of the first slot 310 in the subframe 300 become a control region 350 where control channels are assigned, and the remaining OFDM symbols become a data region 360 where PDSCH (Physical Downlink Shared Channel) is assigned.

The PDCCH may transmit resource allocation and transmission format of DL-SCH (downlink-shared channel), resource allocation information of UL-SCH (uplink shared channel), paging information on PCH, system information on DL-SCH, resource allocation of upper layer control message such as random access response transmitted on PDSCH, a set of transmission power control commands for individual UEs in any UE group, activation information of VoIP (voice over internet protocol). A plurality of PDCCH regions may be defined in the control region 350, and the terminal may monitor the plurality of PDCCHs. The PDCCH is transmitted on the aggregation of one or a few contiguous CCEs (control channel elements). The CCE is the logical assignment unit used to provide the PDCCH with a coding rate depending on the state of radio channel. The CCE corresponds to a plurality of resource element groups. The format of PDCCH and the number of bits in an available PDCCH are determined depending on the correlation between the number of CCEs and coding rate provided by the CCEs.

The base station determines the PDCCH format depending on DCI (downlink control information) to be sent to the terminal and adds a CRC (cyclic redundancy check) to the control information. The CRC is masked with a unique identifier (RNTI; radio network temporary identifier) depending on the owner or purpose of the PDCCH. If the PDCCH is for a specific terminal, the terminal's unique identifier, e.g., C-RNTI (cell-RNTI), may be masked to the CRC. Or, if the PDCCH is for a paging message, a paging indicating identifier, e.g., P-RNTI (paging-RNTI), may be masked to the CRC. If the PDCCH is for a system information block (SIB), a system information identifier, SI-RNTI (system information-RNTI), may be masked to the CRC. In order to indicate a random access response that is a response to transmission of the terminal's random access preamble, an RA-RNTI (random access-RNTI) may be masked to the CRC.

Figure 4:
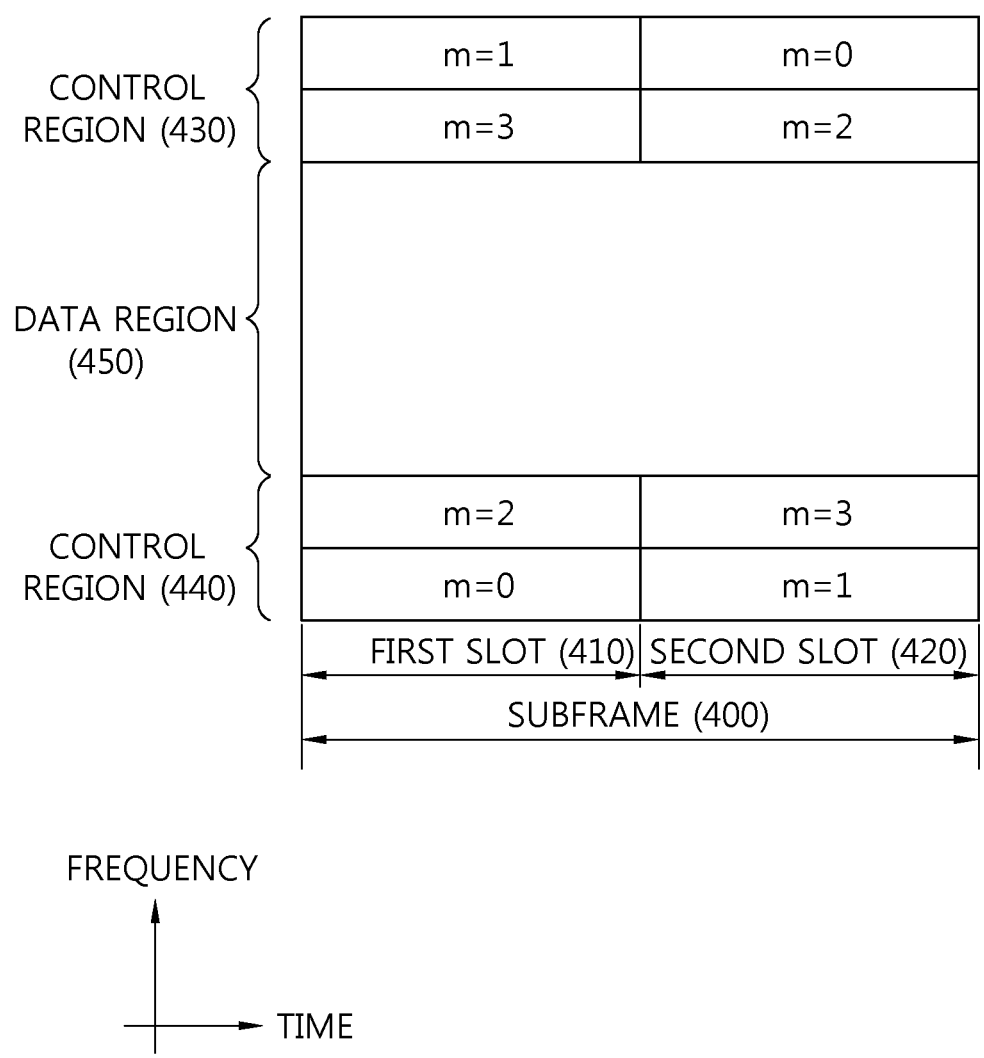
FIG. 4 shows the structure of an uplink subframe.

FIG. 4 shows the structure of an uplink subframe.

The uplink subframe may be split into control regions 430 and 440 and a data region 450 in the frequency domain. The control regions 430 and 440 have PUCCH (physical uplink control channel) assigned to transmit uplink control information. The data region 450 has PUSCH (physical uplink shared channel) assigned to transmit data. When indicated by a higher layer, the terminal may support simultaneous transmission of PUSCH and PUCCH.

The PUCCH for one terminal is assigned in a resource block pair (RB pair) in the subframe 400. The resource blocks in the RB pair occupy different sub-carriers in the first slot 410 and the second slot 420, respectively. The frequency occupied by the resource block belonging to the RB pair assigned to the PUCCH is varied with respect to the slot boundary. This is referred to as "the RB pair assigned to the PUCCH being frequency-hopped at the slot boundary." The terminal may offer a frequency diversity gain by transmitting uplink control information through different sub-carriers according to times. m is a location index indicating the logical frequency region location of the RB pair assigned to the PUCCH in the subframe.

The uplink control information transmitted on the PUCCH includes HARQ (hybrid automatic repeat request) ACK (acknowledgement)/NACK (non-acknowledgement), CQI (channel quality indicator) indicating the downlink channel state, and SR (scheduling request) that is a request for uplink radio resource allocation.

The PUSCH is mapped with the UL-SCH (uplink shared channel) that is a transport channel. The uplink data transmitted on the PUSCH may be a transport block that is a data block for UL-SCH transmitted during a TTI. The transport block may be user information. Or, the uplink data may be multiplexed data. The multiplexed data may be obtained by multiplexing the control information and the transport block for UL-SCH. For example, the control information multiplexed with data may include the CQI, PMI (precoding matrix indicator), HARQ, or RI (rank indicator). Or, the uplink data may consist only of control information.

The resource region for transmitting control information from the base station may include an aggregation of CCEs (control channel elements).

The resource region for transmitting control data in the subframe may include at least one CCE. The CCE is the logical allocation unit of resource region used to apply a coding rate depending on the state of radio channel to the PDCCH data. The CCE may correspond to a plurality of REGs (resource element groups). The REG includes a plurality of resource elements. The format of PDCCH and the number of bits in an available PDCCH are determined depending on the correlation between the number of CCEs and the coding rate provided by the CCEs. One REG includes four Res, and one CCE includes nine REGs.

The resource region for transmitting one PDCCH data may be one of one CCE, two CCEs, four CCEs, and eight CCEs. The number of CCEs assigned to the resource region for transmitting PDCCH data is referred to as the CCE aggregation level. The number of CCEs used for transmission of PDCCH data may be determined depending on the channel state of the base station. For example, the terminal having a good downlink channel state may use one CCE for transmission of PDCCH data. The terminal having a poor downlink channel state may use eight CCEs for transmission of PDCCH data.

The control channel consisting of one or more CCEs performs interleaving on a per-REG basis, and after a cell ID-based cyclic shift is conducted, may be mapped with the physical resource region.

Figure 5:
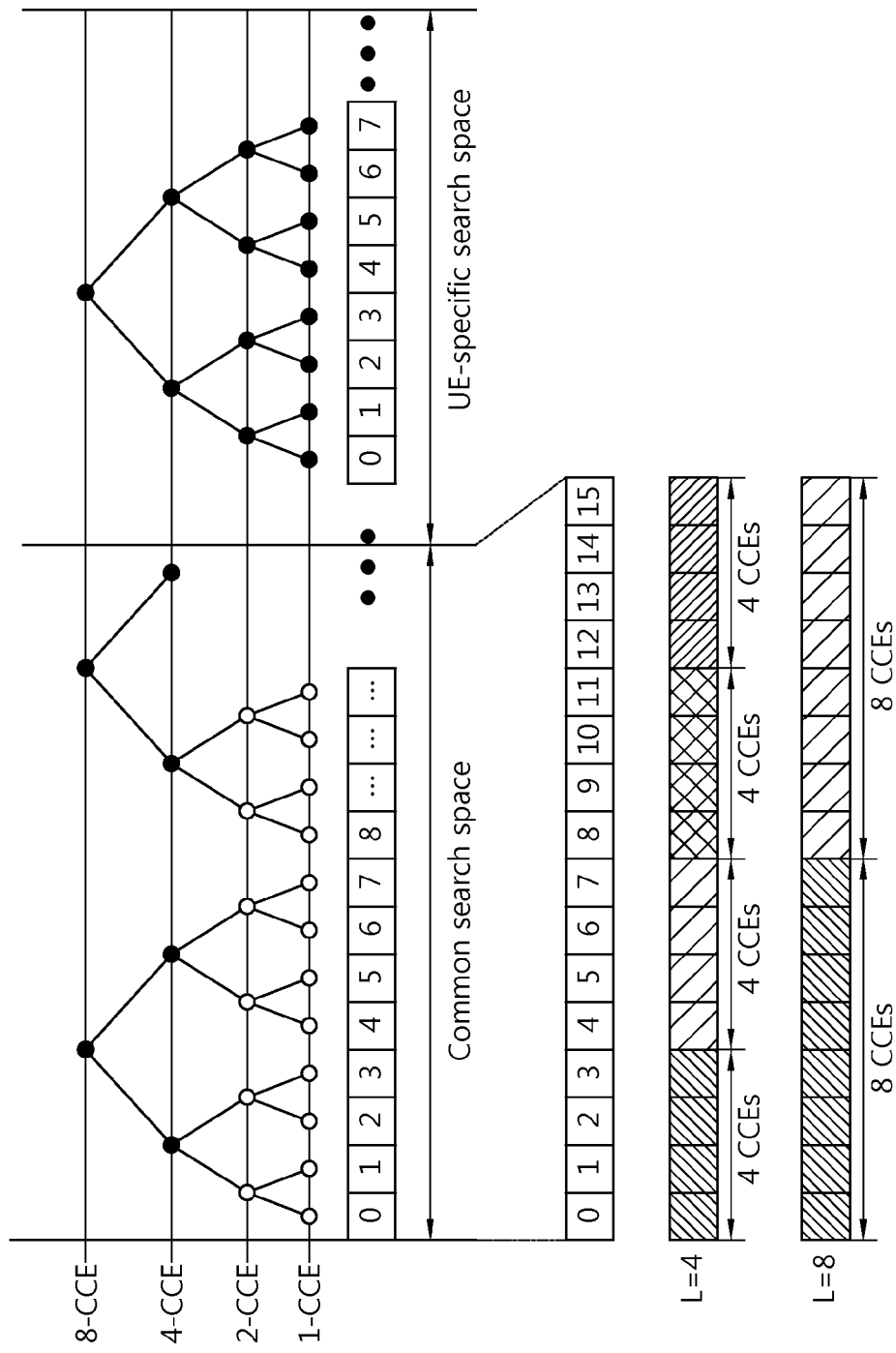
FIG. 5 is a view illustrating an example method for monitoring PDCCH, wherein 3GPP TS 36.213 V10.2.0 (2011-06), Ch. 9 is referenced.

FIG. 5 is a view illustrating an example method for monitoring PDCCH. For this, refer to 3GPP TS 36.213 V10.2.0 (2011-06), Ch. 9.

The terminal performs blind decoding for detecting PDCCH. The terminal is not aware of the position in the resource region and the CCE (control channel element) aggregation level or DCI format used when the PDCCH data is transmitted from the base station. The blind decoding refers to a decoding method of the terminal identifying whether the PDCCH data is its own control data by checking an error in the CRC (cyclic redundancy check) of the PDCCH data received by the terminal.

The base station may send a plurality of PDCCH candidates for a plurality of terminals through one subframe. The PDCCH candidate indicates a PDCCH resource region in which the terminal performs monitoring. The terminal may monitor a plurality of PDCCH candidates every subframe. Here, the terminal attempting to decode the PDCCH data on the PDCCH candidate is denoted "monitoring." The PDCCH candidate may be determined according to the CCE aggregation level and search space.

In order to reduce burden that occurs when the terminal conducts blind decoding, a search space may be defined, and based on the search space, blind decoding may be carried out. An aggregation of the PDCCH candidates determined based on the CCE aggregation level at which the terminal performs blind decoding may be referred to as the search space.

Search spaces may be classified into a common search space and a UE-specific search space. The common search space is a space in which the terminal searches for PDCCH data including common control information. The common search space may include 16 CCEs from CCE index 0 to CCE index 15. The common search space may include PDCCH candidates of CCE aggregation level 4 or 8. The common search space may include PDCCH data (DCI format 0 or 1A) corresponding to the UE-specific information as well as the common control information. The UE-specific search space may include PDCCH candidates of CCE aggregation level 1, 2, 4, or 8.

Table 1 below indicates the number of PDCCH candidates monitored by the terminal.

TABLE 1

| Search space $S_k^{(L)}$ | | | Number of PDCCH |
|---|---|---|---|
| Type | Aggregation level L | Size [in CCEs] | candidates $M^{(L)}$ |
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

The size of search space is determined by Table 1, and the start point of the search space may be defined to be different between the common search space and the UE-specific search space. The start point of the common search space may be fixed regardless of the subframe, while the start point of the UE-specific search space may be varied per subframe, depending on the terminal identifier (e.g., C-RNTI), CCE aggregation level, and/or slot number in the radio frame. In case the start point of the UE-specific search space is positioned in the common search space, the UE-specific search space may overlap the common search space.

The base station may send various reference signals to the terminal through the subframe.

The base station may send a URS (UE-specific reference signal) to the terminal as a reference signal for demodulating the PDSCH data. The URS may be transmitted through antenna port p=5, p=7, p=8 또는 p=7, 8, ..., v+6. v may be the number of layers used for deactivation of PDSCH data. The base station may send a PRB (physical resource block) including the PDSCH data and the URS relating to the PDSCH data to the terminal.

The sequence of the URS corresponding to antenna port 5 may be generated based on Equation 1 below:

$$r_{n_s}(m) = \frac{1}{\sqrt{2}}(1 - 2 \cdot c(2m)) + j\frac{1}{\sqrt{2}}(1 - 2 \cdot c(2m + 1)) \quad \text{<Equation 1>}$$

$$m = 0, 1, \ldots, 12 N_{RB}^{PDSCH} - 1$$

Here, $N_{RB}^{PDSCH}$, denotes the number of RBs corresponding to PDSCH data transmission, and ns denotes a slot number in the radio frame. The pseudo-random sequence c(i) for generating a URS sequence may be determined based on Equation 2 as follows:

$$c(n) = (x_1(n+N_c) + x_2(n+N_c)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \quad \text{<Equation 2>}$$

The pseudo-random sequence c(i) may be defined as a gold sequence whose length is 31 through Equation 2. Here, Nc=1600, and the first m-sequence is initialized as x1(0)=1, x1(n)=0, m=1, 2, ..., 30. The second m-sequence may be initialized by $c_{init} = (\lfloor n_s/2 \rfloor + 1) \cdot (2N_{ID}^{cell} + 1) \cdot 2^{16} n_{RNTI}$. $c_{init}$ is a slot number ns in the radio frame, and the cell ID, $N_{ID}^{cell}$, is a parameter generated based on the terminal's identifier $n_{RNTI}$.

The URS sequence corresponding to antenna port 7, 8, ..., v+6 may be generated based on Equation 3 as follows:

$$r(m) = \frac{1}{\sqrt{2}}(1 - 2 \cdot c(2m)) + j\frac{1}{\sqrt{2}}(1 - 2 \cdot c(2m + 1)) \quad \text{<Equation 3>}$$

$$m = \begin{cases} 0, 1, \ldots, 12 N_{RB}^{max,DL} - 1 & \text{normal cyclic prefix} \\ 0, 1, \ldots, 16 N_{RB}^{max,DL} - 1 & \text{extended cyclic prefix} \end{cases}$$

Here, $N_{RB}^{max,DL}$ means the maximum number of RBs assigned to the frequency bandwidth of the downlink channel.

The pseudo-random sequence c(i) may be generated based on the above-described Equation 2. Unlike the URS sequence corresponding to antenna port 5, the second m-sequence may be initialized by $c_{init} = (\lfloor n_s/2 \rfloor + 1) \cdot (2n_{ID}^{(nSCID)} + 1) \cdot 2^{16} + n_{SCID}$. Among the parameters for determining $c_{init}$, $n_{ID}^{(i)}$ (where, i=0,1) may be determined as follows:

1) If the higher level does not provide $n_{ID}^{DMRS,i}$ or if DCI format 1A, 2B, or 2C is used as the DCI relating to transmission of PDSCH data, $n_{ID}^{(i)} = N_{ID}^{cell}$ (where $N_{ID}^{cell}$ is a cell ID)

2) otherwise, $n_{ID}^{(i)} = n_{ID}^{DMRS,i}$

Among the parameters for determining $C_{init}$, $n_{SCID}$, unless specified, may be 0. For PDSCH data transmission based on antenna port 7 or 8, the terminal may determine $n_{SCID}$ through DCI format 2B or 2C relating to transmission of PDSCH data.

Further, the base station may send a DM-RS (demodulation reference signal) to the terminal as a reference signal for demodulating ePDCCH data. The base station may send the DM-RS through antenna port p=107, p=108, p=109, or p=110.

The reference signal sequence transmitted through the antenna port p=107, p=108, p=109 or p=110 may be generated based on Equation 4 as follows:

$$r(m) = \frac{1}{\sqrt{2}}(1 - 2 \cdot c(2m)) + j\frac{1}{\sqrt{2}}(1 - 2 \cdot c(2m + 1)) \quad \text{<Equation 4>}$$

$$m = \begin{cases} 0, 1, \ldots, 12 N_{RB}^{max,DL} - 1 & \text{normal cyclic prefix} \\ 0, 1, \ldots, 16 N_{RB}^{max,DL} - 1 & \text{extended cyclic prefix} \end{cases}$$

The pseudo-random sequence c(i) may be defined as a gold sequence whose length is 31 through the above-described Equation 2. The second m-sequence may be initialized by $c_{init} = (\lfloor n_s/2 \rfloor + 1) \cdot (2n_{ID,i}^{EPDCCH} + 1) \cdot 2^{19} + n_{SCID}^{EPDCCH}$.

Among the parameters for determining $c_{init}$, $n_{SCID}^{EPDCCH} = 2$, and $n_{ID,i}^{EPDCCH}$ may be set by the higher layer.

The DM-RS for demodulating ePDCCH data and the URS for demodulating PDSCH data may be reference signals generated through a sequence determined based on the same equation.

The initial value, $c_{init}$, for initializing the pseudo-random sequence in the DM-RS and URS is a value generated based on different parameters from each other. However, the initial value, $c_{init}$, for initializing the pseudo-random sequence in the DM-RS and URS may be generated from a generalized equation. Equation 5 below represents a generalized equation for generating $c_{init}$.

$$c_{init} = (\lfloor n_s/2 \rfloor + 1) \cdot (2X + 1) \cdot 2^{16} + Y$$

ns may be a slot number in the radio frame, and X and Y may be the above-described values obtained from Equations 1 and 4 which are equations for a sequence to generate the URS and the DM-RS. Hereinafter, according to an embodiment of the present invention, X is defined as a first initial value determining parameter and Y is a second initial value determining parameter to generate $C_{init}$. Further, $c_{init}$ is defined as a sequence generation initial value.

The first initial value determining parameter and the second initial value determining parameter used for determining the initial value of the pseudo-random sequence of the RS and the DM-RS may be the values transmitted through a higher layer or predetermined values as described above.

Hereinafter, according to an embodiment of the present invention, a method of performing transmission by varying or setting, to be the same, ns and the first initial value determining parameter and the second initial value determining parameter used for determining the initial value of the pseudo-random sequence upon data transmission from a plurality of transmission points to the terminal using the CoMP is described.

The base station may use the pseudo-random sequence in generating reference signals such as the DM-RS or URS as described above. The base station may determine the initial value to generate the pseudo-random sequence. Referring to Equation 5, the base station may determine a sequence generation initial value with the slot number (ns), the first initial value determining parameter, and the second initial value determining parameter. That is, as the slot number (ns), the first initial value determining parameter, and the second initial value determining parameter vary, the sequence generation initial value may vary. In case different sequence generation initial values are used, different pseudo-random sequences may be generated. For example, in case the DM-RS and the URS have different sequence generation initial values from each other, the DM-RS and the URS may be reference signals that have been generated based on different pseudo-random sequences from each other.

The base station may send data to the terminal using the CoMP (coordinated multi-point transmission and reception). Upon data transmission to the terminal using the CoMP, the base station that sends data to the data may be defined as a transmission point. The transmission point may mean one base station or one cell.

Figure 6:
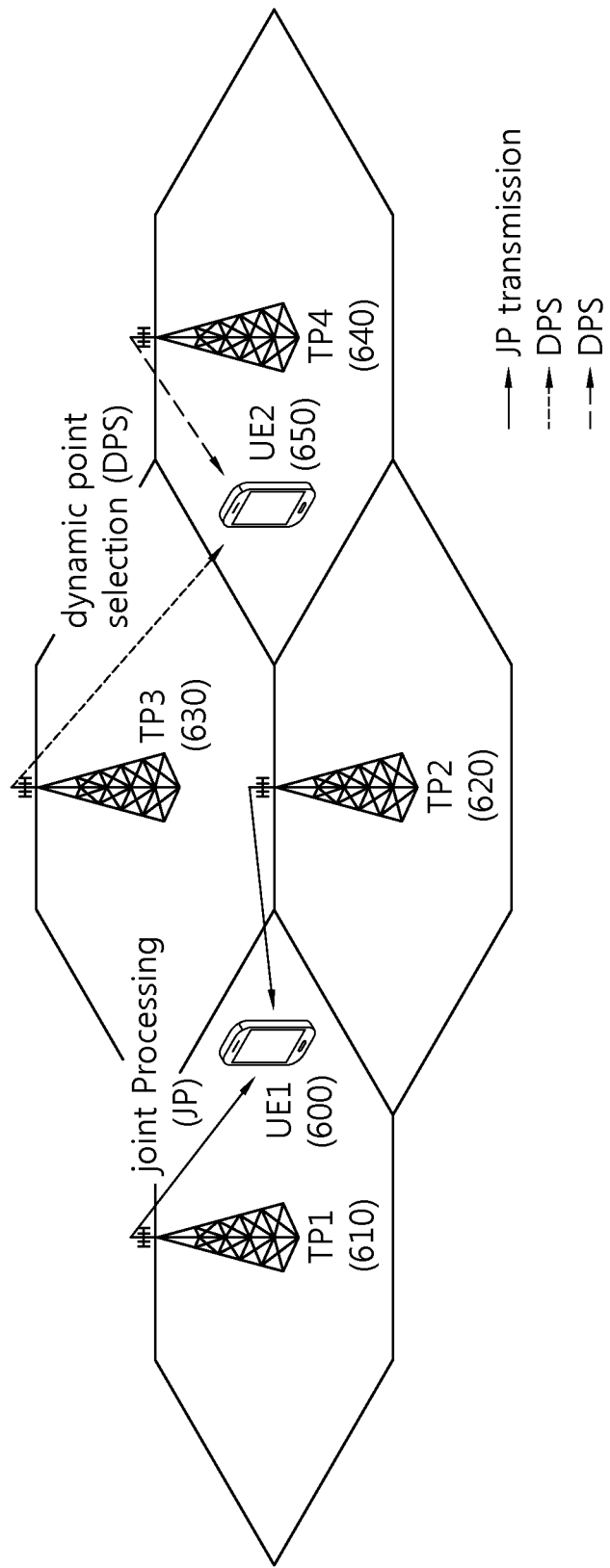
FIG. 6 is a concept view illustrating a method of transmitting ePDCCH data to a terminal based on CoMP from a plurality of transmission points.

FIG. 6 is a concept view illustrating a method of transmitting ePDCCH data to a terminal based on CoMP from a plurality of transmission points.

Referring to FIG. 6, e-PDCCH data may be transmitted from a plurality of transmission points to the terminal based on the CoMP. The plurality of transmission points may generate data that is transmitted to the terminal in the cell based on the same or different cell IDs. Hereinafter, according to an embodiment of the present invention, an example in which ePDCCH data and the DM-RS relating to the ePDCCH data are transmitted from a plurality of transmission points is described. However, alternatively, PDSCH data and the URS relating to the PDSCH data may be transmitted from a plurality of transmission points, and such embodiment also belongs to the scope of the present invention.

Transmission point 1 610 and transmission point 2 620 send the ePDCCH data and DM-RS using a JT (joint transmission) scheme among CoMP schemes. In case the plurality of transmission points 610 and 620 use the JT scheme to send data to the terminal 600, the same data may be simultaneously transmitted to the terminal 600 from different transmission points 610 and 620. The terminal 600 may receive the ePDCCH data transmitted from the different transmission points 610 and 620 and perform demodulation based on the DM-RS relating to the ePDCCH data. The terminal 600 may obtain cell ID indicator through the ePDCCH data transmitted from each transmission point 610 and 620.

Transmission point 3 630 and transmission point 4 640 transmit ePDCCH data and DM-RS relating to the ePDCCH data to the terminal 650 using a DPS (dynamic point selection) scheme among the CoMP schemes.

The DPS scheme allows the terminal to dynamically select a transmission point having a good channel among different transmission points 630 and 640. The terminal may receive data transmitted from the selected transmission point. For example, in case the third transmission point 630 sends ePDCCH data to the terminal 650 at a first time, the second transmission point 640 may send ePDCCH data to the terminal 650 at a second time.

Figure 7:
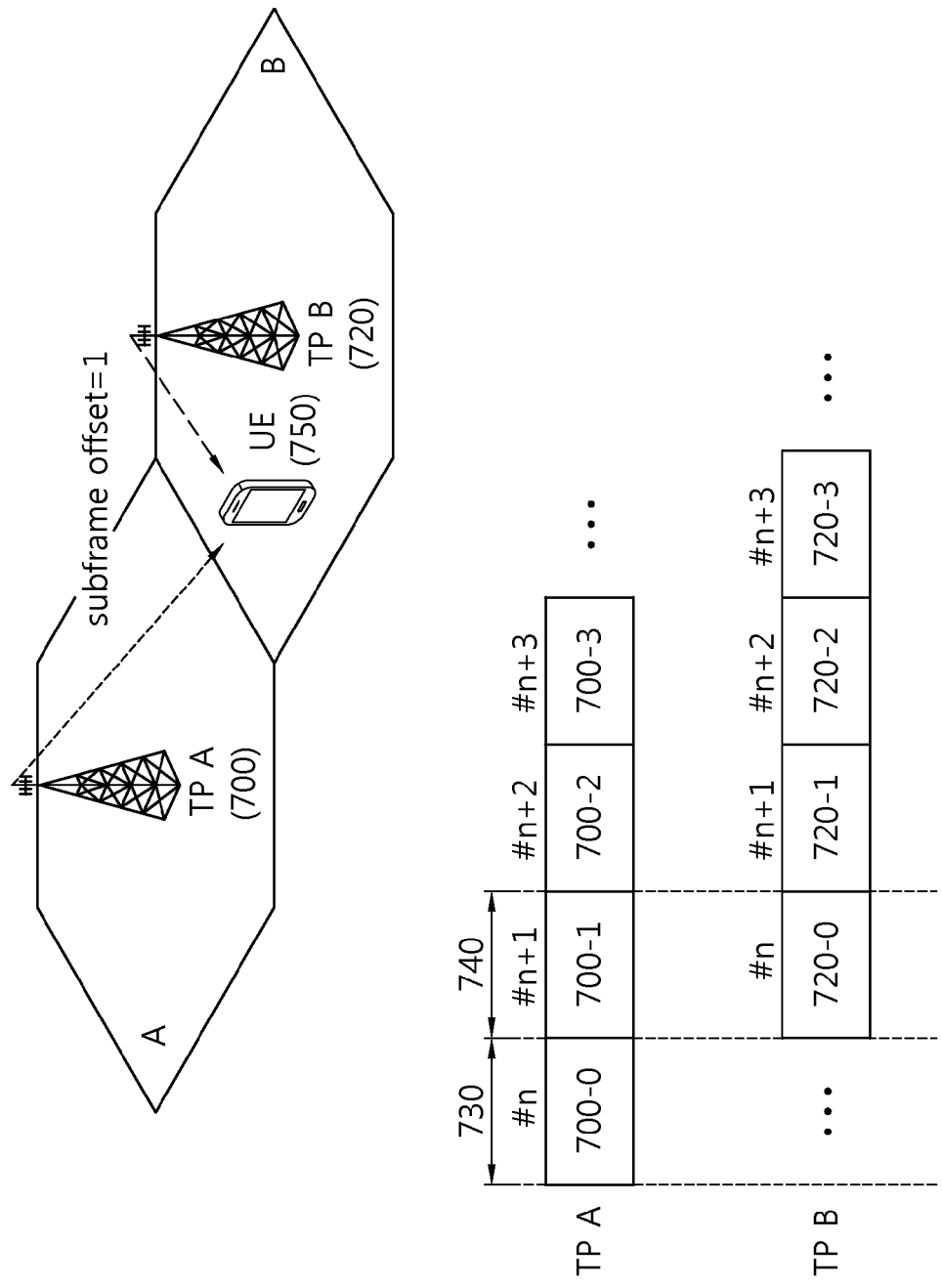
FIG. 7 is a concept view illustrating a method of transmitting data to a terminal based on CoMP from a plurality of transmission points.

FIG. 7 is a concept view illustrating a method of transmitting data to a terminal based on CoMP from a plurality of transmission points.

It is assumed in FIG. 7 that ePDCCH data and DM-RS relating to the ePDCCH data are transmitted from transmission point A 700 corresponding to cell A and transmission point 720 corresponding to cell B to the terminal 750. Further, assume that the subframe offset between the transmission point A 700 and the transmission point B 720 is 1. In case the subframe offset between the transmission point A 700 and the transmission point B 720 is 1, the subframe transmitted from the transmission point A 700 to the terminal 750 and the subframe transmitted from the transmission point B 720 to the terminal 750 may have a difference of 1 over the subframe index and a difference of 2 over the slot index. The difference in the transmission time between different transmission points may occur in units of slot offset, but not in units of subframe offset.

That is, in case the subframe that is transmitted from the transmission point A 700 to the terminal with respect to the same time is subframe #n+1(700-1), the subframe that the transmission point B 720 transmits to the terminal may be subframe #n(720-0).

Referring to FIG. 7, in case the subframe offset between the transmission point A 700 and the transmission point B 720 is 1, the terminal may receive the ePDCCH data and the DM-RS relating to the ePDCCH through the subframe #n(700-0) from the transmission point A 700 at the first time 730 with respect to the terminal 750 and receive the ePDCCH data and the DM-RS relating to the ePDCCH through the subframe #n+1(700-1) at the second time 740. Further, the terminal may receive the ePDCCH data and the DM-RS relating to the ePDCCH through the subframe #n(720-0) from the transmission point B 720 at the second time 740.

It is assumed in FIG. 7 that among the parameters for the transmission point A 700 and the transmission point B 720 to initialize the scrambling sequence of the DM-RS, the first initial value determining parameter and the second initial value determining parameter are set to be the same to determine a sequence generation initial value.

The DM-RS transmitted from the transmission point A 700 through the subframe #n(700-0) at the first time 730 may be a reference signal generated based on the first initial value determining parameter determined based on the above-described Equation 5. The first initial value determining parameter may be determined based on one slot index, the first initial value determining parameter and the second initial value determining parameter of the subframe #n(700-0).

Further, the DM-RS transmitted from the transmission point A 700 through the subframe #n+1(700-1) at the second time 730 may be a reference signal generated based on the second initial value determining parameter generated based on the above-described Equation 5. The second initial value determining parameter may be determined based on one slot index, the first initial value determining parameter, and the second initial value determining parameter of the subframe #n+1(700-1).

The DM-RS transmitted through the subframe #n(720-0) from the transmission point B 720 at the second time 740 may be a reference signal generated based on a third sequence generation initial value that is generated from the above-described Equation 5. The third sequence generation initial value may be determined on one slot index, the first initial value determining parameter, and the second initial value determining parameter of the subframe #n(720-0).

The slot number of the radio frame transmitted from the transmission point A at the second time 740 differs from the slot number of the radio frame transmitted from the transmission point B at the second time. Accordingly, the transmission point A and the transmission point B may send reference signals generated with the reference signal sequences determined based on the different sequence generation initial values from each other.

That is, the DM-RSs received to the terminal 750 from the transmission point A 700 and the transmission point B 720 with respect to the second time 740 be reference signals generated based on different pseudo-random sequences from each other.

That is, even though the first initial value determining parameter and the second initial value determining parameter to determine the sequence generation initial value for generating the DM-RS from a plurality of transmission points are the same as each other, in case the subframe indexes or slot numbers of the frames transmitted from the plurality of transmission points differ from each other, the sequence generation initial value is varied. In such case, the terminal 750 receives the DM-RSs generated with different pseudo-random sequences at the same time.

The terminal 750 should be aware of information such as the subframe offset or difference in slot index between different transmission points in order to demodulate the received DM-RS. That is, the terminal 750 should be aware of information indicating that the DM-RS is received from the transmission point B 720 through the subframe #n(720-0) at the second time 740 and that the DM-RS is received from the transmission point A 700 through the subframe #n+1(700-1).

The terminal 750 may receive from the transmission point information on the difference in the slot index or subframe used to transmit data from different transmission points, and based on this, may perform demodulation on the DM-RS.

Unlike shown in FIG. 7, after making the subframe indexes or slot indexes consistent between the plurality of transmission points, the generated DM-RSs may be transmitted to the terminal.

Figure 8:
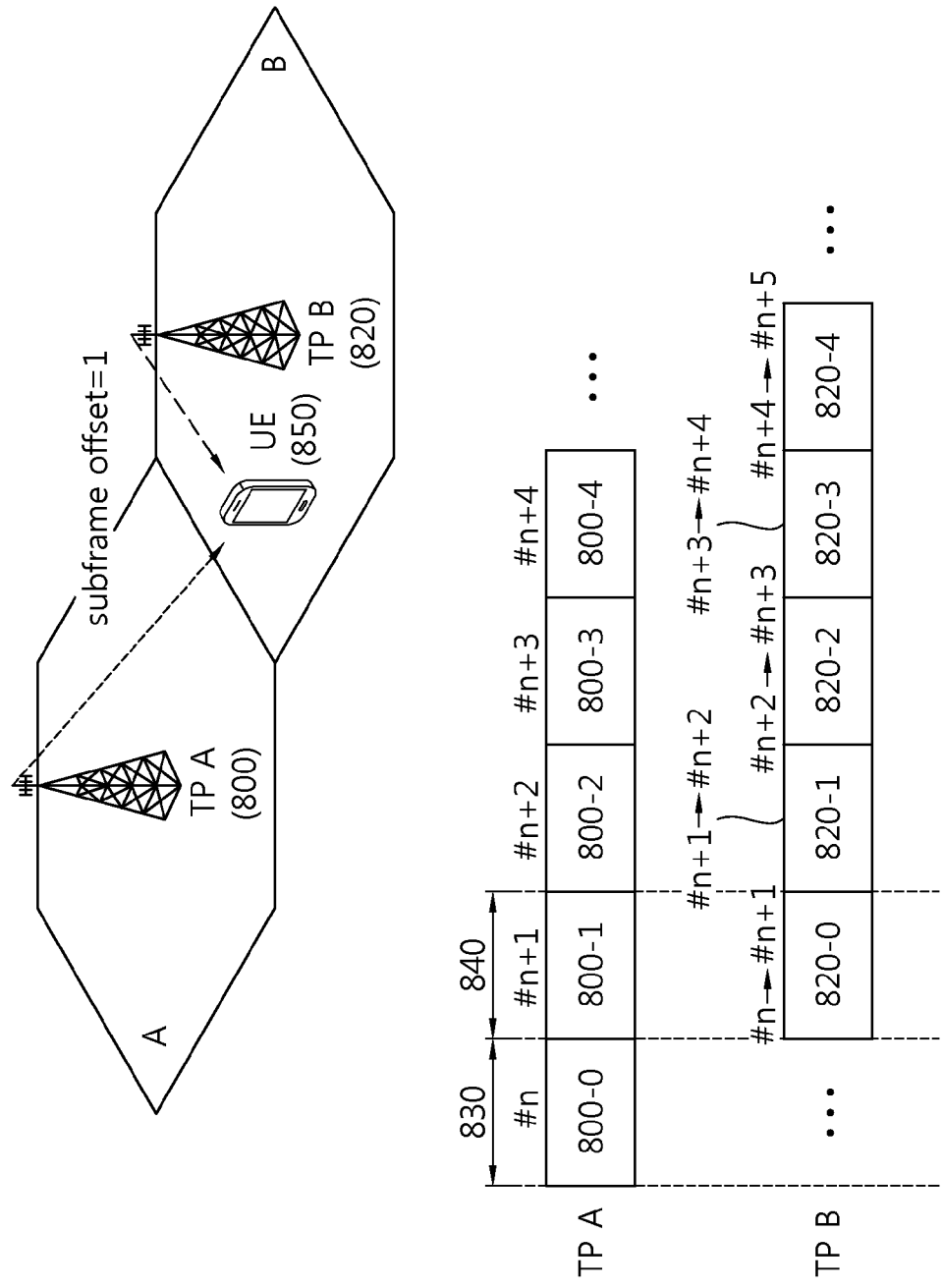
FIG. 8 is a concept view illustrating a method of transmitting data from a plurality of transmission points to a terminal based on CoMP according to an embodiment of the present invention.

FIG. 8 is a concept view illustrating a method of transmitting data from a plurality of transmission points to a terminal based on CoMP according to an embodiment of the present invention.

Referring to FIG. 8, the subframe index or slot index transmitted from the transmission point B 820 may be determined based on the subframe index or slot index transmitted from the transmission point A 800.

The subframe offset transmitted from the transmission point A 800 and the transmission point B 820 may be assumed to be 1 like shown in FIG. 7. If the subframe offset is 1, the slot offset may be 2. In such case, a DM-RS may be generated and transmitted with a pseudo-random sequence determined based on the subframe index of the subframe #n(800-0) at a first time 830 by the transmission point A 800. The transmission point B 820 may reflect the subframe offset (or slot offset) value between the transmission point A 800 and the transmission point B 820 to transmit to the terminal 850 the DM-RS generated with the pseudo-random sequence determined based on the same slot number as the slot number of the subframe #n+1(800-1) used by the transmission point A 800 at a second time 840. In other words, transmission from a plurality of transmission points to the terminal 850 may be made with the slot numbers adjusted to be the same with respect to a particular transmission point. In such case, the terminal 850 may perform demodulation on the DM-RS assuming that the DM-RS received through one subframe is a reference signal generated based on the same pseudo-random sequence.

In other words, the subframe offset information (or slot offset information between different transmission points 800 and 820 may be shared to adjust the slot number or subframe index transmitted from each transmission point based on a particular reference time or a particular transmission point 800. The transmission points 800 and 820 may send to the terminal 850 information for adjusting the subframe indexes (or slot numbers) of the plurality of transmission points 800 and 820, such as the subframe offset information (or slot offset information). The terminal 850 may perform demodulation on the received DM-RS based on the information for adjusting the received subframe index (or slot number).

In case the subframe index (or slot number) of each transmission point 800 and 820 is sorted, and the parameters, the first initial value determining parameter and the second initial value determining parameter, for determining the sequence generation initial value of the DM-RS from the transmission point A 800 and the transmission point B 820 are the same as each other, the terminal 850 may demodulate the DM-RS assuming that the reference signals transmitted from the transmission point A 800 and the transmission point B 820 are reference signals generated with the pseudo-random sequence determined based on the same sequence generation initial value. The plurality of transmission points 800 and 820 may set the parameters, the first initial value determining parameter and the second initial value determining parameter, for determining the sequence generation initial value of the DM-RS to be the same as each other.

Figure 9:
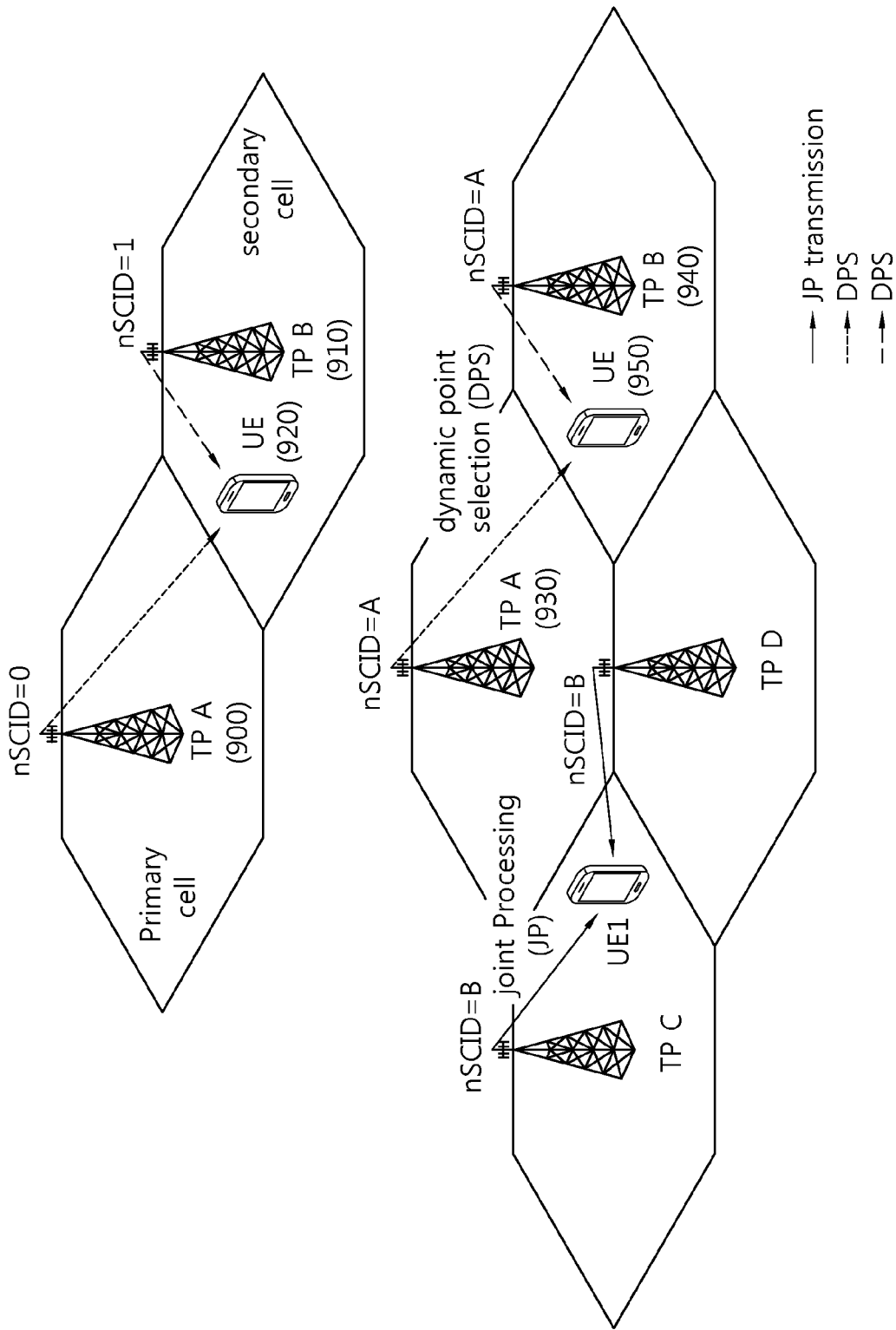
FIG. 9 is a concept view illustrating a method of transmitting data from a plurality of transmission points to a terminal based on CoMP according to an embodiment of the present invention.

FIG. 9 is a concept view illustrating a method of transmitting data from a plurality of transmission points to a terminal based on CoMP according to an embodiment of the present invention.

Referring to FIG. 9(A), the plurality of transmission points 900 and 910 may indicate other information to the terminal 920 based on parameters for determining a sequence generation initial value. For example, cell information may be transmitted to the terminal 920 based on the second initial value determining parameter. It may be indicated based on the second initial value determining parameter whether the cell corresponding to the transmission point 900 and 910 is a serving cell or primary cell.

Referring to FIG. 9(B), as another method, different second initial value determining parameters may be set for their respective transmission points, and the second initial value determining parameters may be used for the purpose of indicating a group of base stations performing a particular transmission scheme among CoMP schemes. The CoMP schemes may be classified into DPS, JT, and CS (coordinated scheduling)/CB (coordinated beamforming) schemes depending on transmission methods. The second initial value determining parameter may be used to indicate a set of transmission points performing the same transmission method among the CoMP schemes. For example, a base station A 930 and a base station B 940 transmitting data to the terminal 950 using the DPS transmission method may use the same second initial value determining parameter.

The subframe offset (or slot offset) between a plurality of transmission points transmitting data to the terminal using DPS may cause not only a difference in the generated pseudo-random sequence of the DM-RS between the transmission points but also interference when the terminal receives control information from the plurality of transmission points. The terminal may determine a UE-specific search space among the resource regions for transmitting PDCCH data and ePDCCH data based on a hashing function.

The hashing function may be used as a function to determine the UE-specific search space. The hashing function may determine a function value based on the subframe index (or slot number). Accordingly, in case a subframe index (or slot offset) is present between transmission points, the control signal transmitted from other transmission point through the UE-specific search space may interfere with the terminal.

Figure 10:
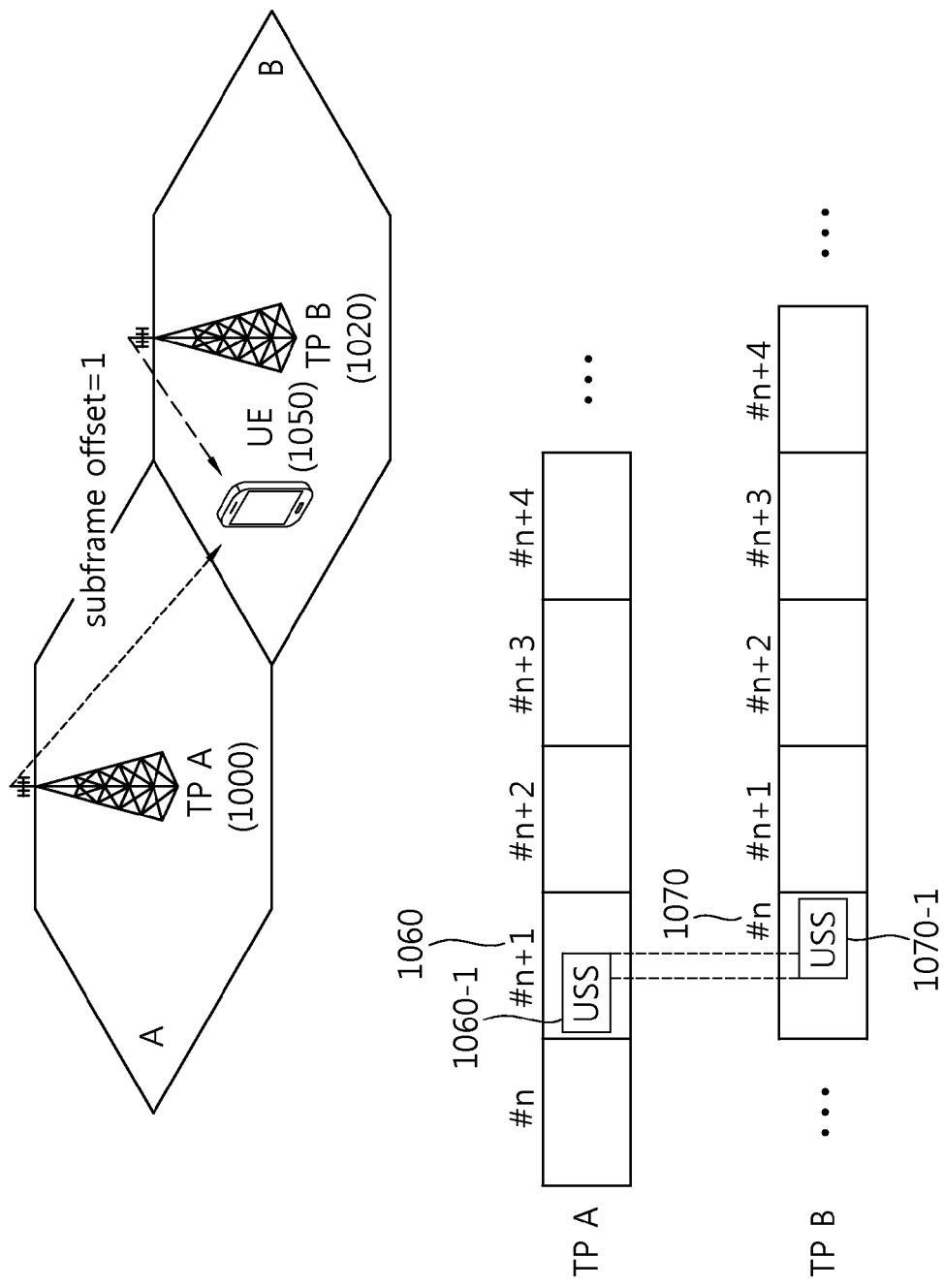
FIG. 10 is a concept view illustrating a method of transmitting data from a plurality of transmission points to a terminal based on CoMP according to an embodiment of the present invention.

FIG. 10 is a concept view illustrating a method of transmitting data from a plurality of transmission points to a terminal based on CoMP according to an embodiment of the present invention.

Referring to FIG. 10, the transmission point B 1020 may send UE-specific control information through a UE-specific search space 1060-1 of the subframe #n(1060) to the terminal. The transmission point B 1020 may determine the position of the UE-specific control region 1070-1 of the subframe #n(1070) through the hashing function based on the index of the subframe #n***1070). The transmission point A 1000 may include the UE-specific control information in the determined UE-specific control region and send it to the terminal 1050.

Assuming that the subframe offset between the transmission point B 1020 and the transmission point A 1000 is 1, the transmission point A 1000 may send the data generated through the subframe #n+1(1060) at the time the transmission point B 1020 sends the subframe #n(1070). The transmission point A 1000 may determine the position of the UE-specific control region 1060-1 through the hashing function based on the index of the subframe #n+1(1060). The transmission point A 1000 may include UE-specific control information on other terminal in the determined UE-specific control region 1070-1 and send it.

In such case, the UE-specific control region 1070-1 determined based on the index of the subframe #n(1-70) from the transmission point B 1020 may at least partially overlap the UE-specific control region 1060-1 determined based on the index of the subframe #n+1(1060) from the transmission point A 1000. The control data transmitted through the overlapping UE-specific control region might not guarantee inter-data orthogonality due to different subframe indexes.

In order to prevent collision between the UE-specific control regions and ensure inter-data orthogonality, no subframe offset (or slot offset) should occur between the subframes transmitted from the transmission points. In order that there is no subframe offset (or slot offset) between the transmission points, subframe offset information (or slot offset information) may be shared between the transmission points. In order for the subframe offset (or slot offset) to be 0 between the transmission points, the subframe index (or slot number) may be adjusted therebetween. In other words, the plurality of transmission points performing CoMP at the same time may be controlled to send subframes having the same subframe index (or slot number) at the same time.

For example, the subframe indexes (or slot numbers) of all of the transmission points may be sorted with respect to a particular transmission point, and transmission may be then performed. In order to sort subframe indexes (or slot numbers) between the transmission points, the subframe offset information (slot offset information) may be shared between the transmission points. The transmission points may send the subframe offset information (or slot offset information) to the terminal.

As a method to prevent interference from occurring between UE-specific control information transmitted from the plurality of transmission points, the region for transmitting the UE-specific control information may be fixed per transmission point. For example, base station A and base station B may be configured to transmit UE-specific control information only through different resource regions. Since different resource regions are defined and used, no interference may occur between the control information transmitted from the transmission points to the terminal.

Referring to FIGS. 6 to 10, an example in which ePDCCH data and DM-RS relating to the ePDCCH data are transmitted from the plurality of transmission points and are received by the terminal has been described. However, the embodiment may apply likewise to the PDSCH data and the URS relating to the PDSCH data.

For example, the terminal receiving the URS from the plurality of base stations may estimate the pseudo-random sequence of the data received based on the subframe offset (or slot offset) to demodulate the URS. As another method, the subframe index (or slot number) transmitted from a transmission point may be determined based on the subframe index (or slot number) transmitted from another transmission point to thus generate a URS, and the URS may be transmitted.

The sequence generation initial values of the URS and the DM-RS may have a predetermined correlation. For example, the first initial value determining parameter and the second initial value determining parameter used to determine the sequence generation initial value of the DM-RS may be the same as the first initial value determining parameter and the second initial value determining parameter used to determine the sequence generation initial value of the URS. As another example, the first initial value determining parameter and the second initial value determining parameter for determining the sequence generation initial values of the DM-RS and the URS may be selected as a predetermined combination.

The sequence generation initial value of the DM-RS may be used as the sequence generation initial value of the URS. The sequence generation initial value of the DM-RS may be a previously retained value.

For example, the terminal may demodulate the DM-RS and the URS based on a predetermined sequence generation initial value upon performing initial cell access. The terminal may receive a sequence generation initial value varied through RRC signaling. The default value of the sequence generation initial value may be set to be different depending on the configuration of the search region or RB indexes.

A DM-RS at a particular position may be generated with the default value of the sequence generation initial value. The sequence determined based on the sequence generation initial value may be denoted fallback sequence, and a reference signal generated with the fallback sequence may be denoted fallback reference signal. For example, the base station may send a fallback DM-RS and/or a fallback URS, and the terminal may demodulate the same based on the fallback sequence.

The plurality of transmission points may send information on the sequence generation initial value to the terminal using the CoMP. For example, each transmission point may send the sequence generation initial value in the form of a combination of the first initial value determining parameter and the second initial value determining parameter. For example, the first transmission point may send the first initial value determining parameter and the second initial value determining parameter of the first transmission point to the terminal, and the second transmission point may send the first initial value determining parameter and the second initial value determining parameter of the second transmission point. The first initial value determining parameters transmitted from the first transmission point and the second transmission point may be the same, and the second initial value determining parameters transmitted from the first transmission point and the second transmission point may be the same.

Figure 11:
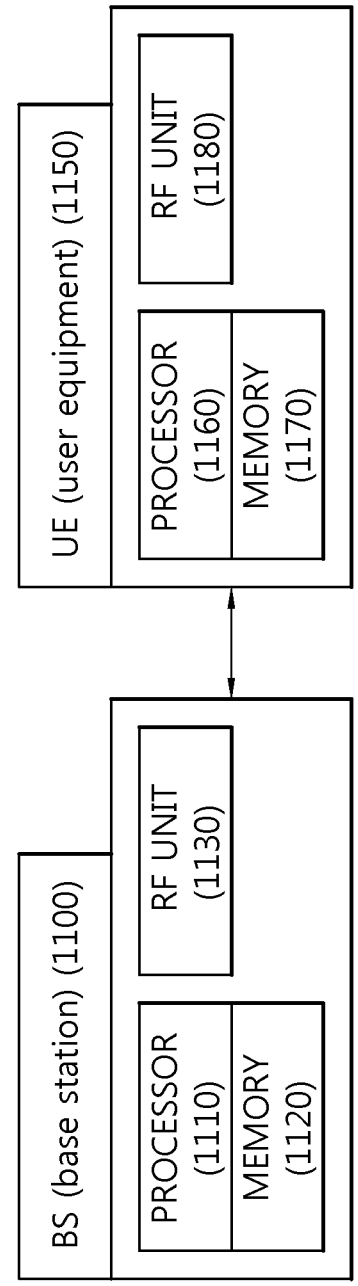
FIG. 11 is a block diagram illustrating a wireless communication system according to an embodiment of the present invention.

FIG. 11 is a block diagram illustrating a wireless communication system according to an embodiment of the present invention.

Referring to FIG. 11, the base station 1100 includes a processor 1110, a memory 1120, and an RF (radio frequency) unit 1130. The memory 1120 is connected with the processor 1110 to store various information to drive the processor 1110. The RF unit 1120 is connected with the processor 1110 to transmit and/or receive radio signals. The processor 1110 implements the proposed functions, processes, and/or methods. In the above-described embodiments, the operation of the base station may be implemented by the processor 1110.

For example, the processor 1110 may generate a reference signal sequence based on a slot number of another terminal.

The wireless device 1150 includes a processor 1160, a memory 1170, and an RF unit 1180. The memory 1170 is connected with the processor 1160 to store various information to drive the processor 1160. The RF unit 1180 is connected with the processor 1160 to transmit and/or receive radio signals. The processor 1160 implements the proposed functions, processes, and/or methods. In the above-described embodiments, the operation of the wireless device may be implemented by the processor 1160.

For example, the processor 1160 may demodulate reference signals received based on the subframe offset or slot offset between the transmission points.

The processor may include an ASIC (application-specific integrated circuit), other chipsets, a logic circuit, and/or a data processing device. The memory may include an ROM (read-only memory), an RAM (random access memory), a flash memory, a memory card, a storage medium, and/or other storage devices. The RF unit may include a baseband circuit for processing radio signals. When an embodiment is implemented in software, the above-described schemes may be realized in modules (processes, or functions) for performing the above-described functions. The modules may be stored in the memory and executed by the processor. The memory may be positioned in or outside the processor and may be connected with the processor via various well-known means.

In the above-described systems, the methods are described with the flowcharts having a series of steps or blocks, but the present invention is not limited to the steps or order. Some steps may be performed simultaneously or in a different order from other steps. It will be understood by one of ordinary skill that the steps in the flowcharts do not exclude each other, and other steps may be included in the flowcharts or some of the steps in the flowcharts may be deleted without affecting the scope of the invention.

What is claimed is:

1. A method of transmitting data, the method comprising:
transmitting a reference signal sequence r(m) to a terminal, wherein a first transmission point determines the reference signal sequence r(m) as follows:

$$r(m) = \frac{1}{\sqrt{2}}(1 - 2 \cdot c(2m)) + j\frac{1}{\sqrt{2}}(1 - 2 \cdot c(2m+1)),$$

wherein m an RB (resource block) corresponding to a frequency bandwidth of a downlink channel, and c( ) denotes a pseudo-random sequence, wherein an initial value, $c_{init}$, of the pseudo-random sequence is determined as follows:

$$c_{init} = (\lfloor n_s/2 \rfloor + 1) \cdot (2X+1) \cdot 2^{16} + Y,$$

wherein ns is a slot number in a radio frame, X is a first initial value determining parameter, and Y is a second initial value determining parameter, and wherein ns is determined based on a slot number of a radio frame transmitted from a second transmission point to the terminal.

2. The method of claim 1,
wherein the first initial value determining parameter of the first transmission point is determined based on the first initial value determining parameter of the second transmission point to be the same as the first initial value determining parameter of the second transmission point, and
wherein the second initial value determining parameter of the first transmission point is determined based on the second initial value determining parameter of the second transmission point to be the same as the second initial value determining parameter of the second transmission point.

3. The method of claim 1, further comprising:
determining a UE-specific search space by the first transmission point, wherein the UE-specific search space is determined based on a slot number of the second transmission point.

4. The method of claim 1,
wherein the reference signal is a DM-RS (demodulation reference signal) for demodulating control information including downlink assignment and uplink grant information, and the $c_{init}$ of the DM-RS is used as $c_{init}$ of a URS (UE-specific reference signal) that is a reference signal for demodulating traffic data.

5. The method of claim 1,
wherein the second initial value determining parameter is a value set depending on whether a cell corresponding to the first transmission point is a primary cell.

6. The method of claim 1,
wherein the second initial value determining parameter varies depending on data transmission methods of the first transmission point.

7. A first base station transmitting data in a wireless communication system, the first base station comprising:
a processor configured to transmit a reference signal sequence r(m) to a terminal, wherein the processor determines the reference signal sequence r(m) as follows:

$$r(m) = \frac{1}{\sqrt{2}}(1 - 2 \cdot c(2m)) + j\frac{1}{\sqrt{2}}(1 - 2 \cdot c(2m+1)),$$

wherein m an RB (resource block) corresponding to a frequency bandwidth of a downlink channel, and c( ) denotes a pseudo-random sequence, wherein an initial value, $c_{init}$, of the pseudo-random sequence is determined as follows:

$$c_{init} = (\lfloor n_s/2 \rfloor + 1) \cdot (2X+1) \cdot 2^{16} + Y,$$

wherein ns is a slot number in a radio frame, X is a first initial value determining parameter, and Y is a second initial value determining parameter, and wherein ns is determined based on a slot number of a radio frame transmitted from a second base station to the terminal.

8. The first base station of claim 7, wherein the first initial value determining parameter of the first base station is determined based on the first initial value determining parameter of the second base station to be the same as the first initial value determining parameter of the second base station, and wherein the second initial value determining parameter of the first base station is determined based on the second initial value determining parameter of the second base station to be the same as the second initial value determining parameter of the second base station.

9. The first base station of claim 7, wherein the processor is configured to determine a UE-specific search space, and wherein the UE-specific search space is determined based on a slot number of the second base station.

10. The first base station of claim 7, wherein the reference signal is a DM-RS (demodulation reference signal) for demodulating control information including downlink assignment and uplink grant information, and wherein the $c_{init}$ of the DM-RS is used as $c_{init}$ of a URS (UE-specific reference signal) that is a reference signal for demodulating traffic data.

11. The first base station of claim 7, wherein the second initial value determining parameter is a value set depending on whether a cell corresponding to the first base station is a primary cell.

12. The first base station of claim 7, wherein the second initial value determining parameter varies depending on data transmission methods of the first base station.

* * * * *